United States Patent [19]

Muniz et al.

[11] 3,741,333

[45] June 26, 1973

[54] GENERATORS OF FLUID WAVE TRAINS

[75] Inventors: Raymond Muniz, Versailles; Robert Argirakis, Legue de Longroi, both of France

[73] Assignee: Compagnie Generale De Geophysique, Paris, France

[22] Filed: Jan. 23, 1969

[21] Appl. No.: 793,415

[52] U.S. Cl. .................. 181/.5 H, 340/7, 340/17, 116/137 R
[51] Int. Cl. ............................................. G01v 1/02
[58] Field of Search ................... 116/137 R, 137 A; 181/.5 H; 340/7, 8

[56] References Cited
UNITED STATES PATENTS 3,277,437  10/1966  Bouyoucos ........................... 340/12
3,369,627  2/1968  Schempf ............................... 181/.5

Primary Examiner—Benjamin A. Borchelt
Assistant Examiner—H. A. Birmiel
Attorney—Waters, Roditi, Schwartz & Nissen

[57] ABSTRACT

A generator produces vacuum or pressure surges in a sea or a lake so as to form seismic wave trains passing through the bottom of the water bed and back into the water for subsequent investigation. The generator includes a movable system, mainly a disc or a cylinder cover adapted to move between predetermined limits under the impact of a hammering means constituted as a piston urged forwardly in a cylinder so as to violently strike the rear end of the movable system and to produce thereby the desired surges to the rear and/or front of the movable system. The hammering means is subjected when released to the hydrostatic pressure which urges it forwardly into engagement with the rear end of the movable system constituted advantageously by a rod rigid with the disc or the like and extending coaxially in the cylinder for cooperation with the piston.

7 Claims, 7 Drawing Figures

GENERATORS OF FLUID WAVE TRAINS

The present invention relates to a generator of fluid wave trains or shock waves adapted to be immersed in a body of water such as the sea, a lake and the like and to produce wave trains constituted by surges of fluid under increased or reduced pressure conditions and which may be termed respectively pressure and vacuum wave trains. Such generators are chiefly, but not exclusively intended for submarine seismic prospection. It is a well-known fact that submarine prospecting by seismic methods is now increasing favor. According to said methods, seismic waves produced under water are propagated within the water and reach the bottom of the sea or of the lake so as to enter the underlying strata. After partial refraction or reflection therein, they return to the water bed and re-enter the water in order to be finally collected by hydrophones located at suitable points in or on the sea or lake.

The present invention is particularly directed to a generator of seismic waves which may be utilized to in such a case.

It is known that wave trains resulting in seismic waves may be produced either by a pressure surge caused by a sudden increase in the volume of an immersed object or by a vacuum or reduced pressure surge caused by a vacuum developed suddenly within the water.

The generator according to the present invention is adapted for producing wave trains of either type as required.

The problem to be solved consists in the production of a very high speed relative movement between two members in order to produce the wave train. According to the invention, this shifting of one member with reference to the other is obtained substantially by means of a stationary member constituted by the outer surface of the generator while the other member is constituted by a disc or cylinder cover which is as light as possible and controlled by a rod entering the generator; a solid piston located in the generator strikes the end of the free end of said rod in each forward stroke so as to exert a hammering which produces, by reason of the light weight of the movable system constituted by the movable disc or cylinder and the associated control rod, the desired wave train.

According to a further feature of the invention, the energy required for displacing piston is that of the hydrostatic pressure of the water in which the generator is immersed, said hydrostatic pressure being capable, by reason of a suitable size given to the piston, of transmitting to the latter at the moment at which it is to strike the movable system a kinetic energy which is sufficient for producing a seismic wave of a suitable amplitude.

Of course, it is necessary when a wave train has been released to return the piston to its original starting position under the action of a force which is large enough for it to overcome the hydrostatic pressure of the water in which the generator is immersed. This operation is effected by auxiliary means which do not per se form part of the invention.

The great advantage ascribable to the use of the hydrostatic pressure of water for supplying kinetic energy to the generator piston resides in that said hydrostatic pressure may produce the considerable instantaneous power which is required for obtaining a high kinetic energy, whereas the power supplied by compressed gas, for instance for returning the piston into its starting position after the production of the wave train, may be much smaller since it is possible to allow the return stroke of the piston to extend during a period which is much longer than that provided for its forward stroke.

According to a still further feature of the invention, the volume within which the piston moves, once it has been brought into its starting position, is subjected to a partial vacuum so as to prevent the pressure of air from braking the forward thrust of the piston.

Further features and advantages of the invention will appear from the following description, reference being made to the accompanying diagrammatic drawings wherein.

The different generators illustrated in FIGS. 1 to 5 are illustrated in a horizontal position but, when used for submarine seismic prospection, their axes extend vertically.

Figure 1:
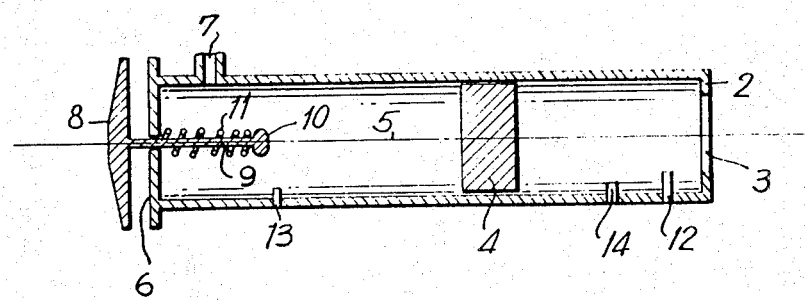
FIG. 1 illustrates an embodiment provided for the production both of a pressure wave train and of a vacuum wave train, said embodiment including a movable system constituted by a simple disc; in said embodiment the piston is returned into its starting position by compressed gas.

In FIG. 1, the generator includes a cylinder 1 whose right-hand end 2 is provided with a large opening 3 connection the right-hand chamber defined by the piston 4 in the cylinder with the water in which the generator is immersed. The piston 4 is adapted to move in the cylinder 1 and is urged towards the right-hand side a volume of compressed gas introduced into the chamber 5 formed by the inside of the cylinder between the piston 4 and the corresponding end 6 on the left-hand side, said input of compressed gas being provided through the pipe 7. In the initial position of the piston 4, it engages the right-hand end 2 of the cylinder 1. The piston 4 may be held in said initial starting position by means of locking means illustrated diagrammatically by a catch 12 preferably controlled electrically, said catch 12 being collapsible for releasing the piston 4.

The movable system is constituted by a circular disc 8 carried by a spindle 9 extending through a central port formed in the end 6. The free end of the spindle 9 is provided with a wear-resisting head 10 adapted to be struck by the piston 4. The disc 8, when inoperative, engages the left-hand end 6 of the cylinder and is urged into such a position by a spring 11 surrounding its spindle 9.

The operation of the apparatus is as follows: the compressed gas fed by the pipe 7 urges the piston 4 towards its starting position to the right against the action of the hydrostatic pressure exerted on the right-hand side thereof. When the piston has reached its starting position, the piston is locked by the catch 12, after which the piston being thus held fast, the pressure of the gas in the cylinder chamber 5 to the left of the piston is diminished and a partial vacuum is preferably provided by means of suction exerted through the pipe 7. The wave train is then obtained by a mere release of the catch 12 so that when the catch has actually retracted, the hydrostatic pressure exerted on the right-hand side of the piston 4 urges the latter towards the left with a kinetic energy of the desired value. The left-hand side of the piston 4 then strikes the head 10 of the spindle 9 and produces a high speed shifting from right to left of the disc 8 which is immersed in the water. Under the action of the vacuum thus formed between the right-hand side of the disc 8 and the cover 6 of the cylinder, a vacuum train of waves arises while simultaneously a pressure wave train is produced by the motion exerted by the left surface of said disc on the water. In order to accurately define the moment at which a wave train is produced, a contact-piece 13 is located substantially in transverse registry with the position occupied by the head 10 when the disc is in its inoperative position. Said contact-piece when actuated by the forward movement of the piston defines the moment of initiation of a wave train. Similarly, the moment at which the piston 4 starts on its forward travel is defined through actuation of a further contact-piece 14, which actuation starts operation of a recording means, whereas the moment defined on said recording means by the contact-piece 13 corresponds, possibly after correction by a predetermined value, to the generator of the wave train.

Of course, the contact-pieces 13 and 14 are drawn only symbolically in FIG. 1 and their detailed construction is irrelevent as concerns the present invention.

Figure 2:
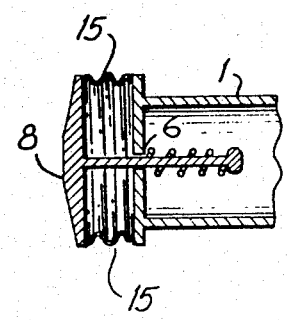
FIGS. 2 to 5 illustrate partial views of different modifications of the movable system.

FIGS. 2 to 5 are partial view illustrating modifications of the movable system. The outer edge of the disc 8 illustrated in FIG. 2 is connected with the outer edge of the left-hand end 6 by an elastic diaphragm forming a bellows as illustrated at 15. Said elastic diaphragm prevents any external water from entering the space extending between the disc 8 and the left-hand side of the end 6 during the movement of the disc from the right to the left whereby the surges forming the vacuum wave train are eliminated so that with the modification illustrated in FIG. 2 only the pressure wave train is obtained.

Figure 3:
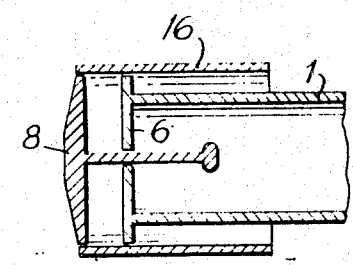

In the embodiment illustrated in FIG. 3, the disc 8 is rigid with an auxiliary cylinder 16 coaxially surrounding the cylinder 1. A suitable packing is inserted between the cylinders 1 and 16. In this embodiment, the vacuum wave train is again eliminated and only the pressure wave train remains.

Figure 4:
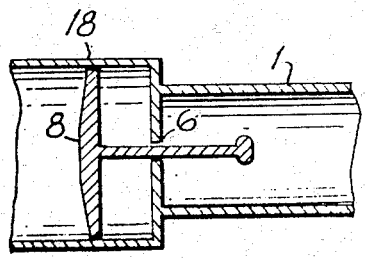

In FIG. 4, the cylinder 1 includes an extension on the left-hand side, said extension forming a broader cylindrical section 18 rigid with the cylinder 1 and in which the disc 10 is adapted to slide so as to produce, as above, a pure pressure wave train.

Figure 5:
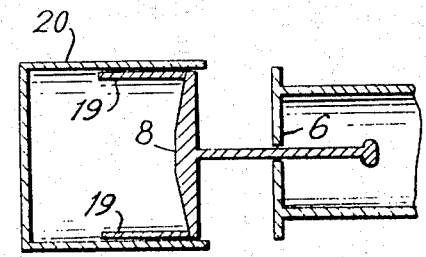

In the embodiment of FIG. 5, the disc 8 is rigid with a cylindrical section 19 facing away from the cylinder 1 and slidingly fitted in an auxiliary stationary cylinder 20 rigidly connected with said cylinder 1 by means which are not illustrated. A suitable packing is provided between the sliding cylindrical section 19 and the auxiliary cylinder 20 which is closed at its outer end and inwardly subjected to a partial vacuum before the piston 4 is caused to move. It is apparent that with such an embodiment there is produced only a vacuum pressure wave by reason of the vacuum produced in the space between the two cylinders 1 and 20 upon movement of the disc towards the left away from the end 6 of the cylinder 1 while the pressure surges are eliminated by the closed cylinder 20.

Figure 6:
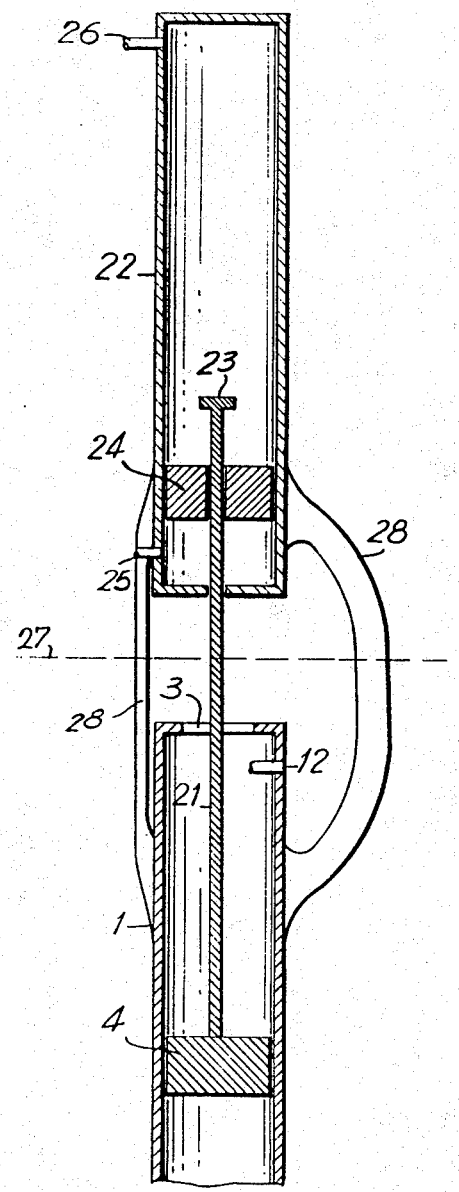
FIG. 6 illustrates an embodiment wherein the piston is returned to its starting position by hydraulic mean.

Lastly, FIG. 6 illustrates a modification of the means for returning the piston 4 to its staring position, said modification resorting to hydraulic control means. The right-hand end of the cylinder 1, its piston 4 and stop catch 12 of FIG. 1 are illustrated in a manner similar to said FIG. 1 while the left-hand end of the cylinder 1 associated with the movable system is not illustrated since it can be identical with any of the arrangements illustrated in FIGS. 1 to 5.

In FIG. 6, the piston 4 instead of being free is secured to the end of a control rod 21 passing out of the cylinder 1 through the rear port 3 whose diameter is much larger than that of said rod 21. The rod 21 enters a further cylinder 22 coaxial with the cylinder 1 and rigidly secured thereto in any suitable manner. A packing ensures fluidtightness for the rod 21 as it enters the cylinder 22. The free end of the rod 21 carries a head 23 while an auxiliary piston 24 is adapted to move in the cylinder 22, the outer end of which is closed. The auxiliary piston 24 is provided with an axial bore in which the rod 21 is slidingly movable. The cylinder 22 is provided at its opposite ends with inputs for pipes 25 and 26 through which oil or other suitable pressurized fluid can be fed into or out of said cylinder 22 under the action of suitable control means.

The operation is as follows:

The piston 4 being located at the inner end of its stroke after it has struck the movable system, oil under pressure enters through the pipe 25 into the front chamber of the cylinder 22, while simultaneously the oil carried in the rear chamber of said cylinder 22 passes out of it through the pipe 26. The oil pressure thus obtained urges forwardly the auxiliary piston 24 which was originally at the front end of its stroke so as to engage the head 23 of the rod 21 and to carry it along with the piston 4 until the piston 4 is locked in its rearmost position by the catch 12.

The piston 4 being thus locked in its starting position, the auxiliary piston 24 is returned inwardly by the pressure of the oil drawn in through the pipe 26 while the oil underneath the auxiliary piston 24 is removed through the pipe 25. The apparatus is thus ready for the execution of a further operative stroke.

Figure 7:
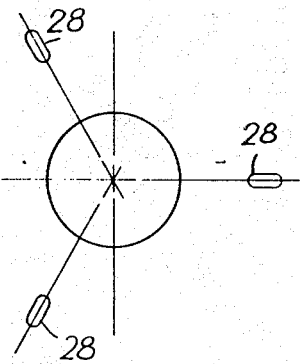
FIG. 7 is a cross-section taken along line 27 in FIG. 6.

FIG. 7 is a cross-section in a plane defined by the line 27 of FIG. 6, which plane is perpendicular to the axis of the cylinders 1 and 22. FIG. 7 shows in combination with FIG. 6 the means for rigidly interconnecting the two cylinders 1 and 21. As illustrated, three outer arms 28 are arranged in radial planes with reference to the cylinders and are secured at their opposite ends to the corresponding cylinders. The arms 28 are streamlined so as to offer minimum resistance against the water flowing radially to either side of said arms before entering the annular opening 3 in the cylinder 1 during the operative stroke of the piston 4.

This manner of rigidly interconnecting two coaxial cylinders may obviously be used in the case of the stationary cylinders of the embodiment according to FIG. 5.

It will be readily ascertained that many other embodiments of the invention are possible within the scope of the accompanying claims.

What I claim is:

1. A generator of wave trains in water comprising a stationary cylinder adapted to be immersed in water and having a front end which is closed and a rear end which is open, a piston slidingly carried in the cylinder, means for locking the piston in position near the rear end of the cylinder, a movable system including a plate extending outside the front end of the cylinder perpendicularly to the axis of the latter and a rod rigid with said plate and slidingly extending through the closed front end of the cylinder, means urging the plate towards the outer surface of the closed front end of the cylinder and the rod to a projecting position within the cylinder, means adapted to release the piston locking means whereby the hydrostatic pressure forceably urges the piston forwardly to make it impinge on the rear end of said rod and cause the plate to move outwardly thereby to produce surges in the water, and a bellows interconnecting the outer edges of the front end of the cylinder and of the plate to form a closed chamber between said front end and said plate.

2. A generator of wave trains in water comprising a stationary cylinder adapted to be immersed in water and having a front end which is closed and a rear end which is open, a piston slidingly carried in the cylinder, means for locking the piston in position near the rear end of the cylinder, a movable system including a plate extending outside the front end of the cylinder perpendicularly to the axis of the latter and a rod rigid with said plate and slidingly extending through the closed front end of the cylinder, means urging the plate towards the outer surface of the closed front end of the cylinder and the rod to a projecting position within the cylinder, means adapted to release the piston locking means whereby the hydrostatic pressure forceably urges the piston forwardly to make it impinge on the rear end of said rod and cause the plate to move outwardly thereby to produce surges in the water, and a cylindrical section rigid with the outer edge of the plate directed rearwardly to sealingly and slidingly engage the outer periphery of the cylinder.

3. A generator of wave trains in water comprising a stationary cylinder adapted to be immersed in water and having a front end which is closed and a rear end which is open, a piston slidingly carried in the cylinder, means for locking the piston in position near the rear end of the cylinder, a movable system including a plate extending outside the front end of the cylinder perpendicularly to the axis of the latter and a rod rigid with said plate and slidingly extending through the closed front end of the cylinder, means urging the plate towards the outer surface of the closed front end of the cylinder and the rod to a projecting position within the cylinder, means adapted to release the piston locking means whereby the hydrostatic pressure forceably urges the piston forwardly to make it impinge on the rear end of said rod and cause the plate to move outwardly thereby to produce surges in the water, and a forwardly open cylindrical extension of the cylinder lying to the front thereof and in which the plate is slidingly and sealingly fitted.

4. A generator of wave trains in water comprising a stationary cylinder adapted to be immersed in water and having a front end which is closed and a rear end which is open, a piston in position near the rear end of the cylinder, a movable system including a plate extending outside the front end of the cylinder perpendicularly to the axis of the latter and a rod rigid with said plate and slidingly extending through the closed front end of the cylinder, means urging the plate towards the outer surface of the closed front end of the cylinder and the rod to a projecting position within the cylinder, means adapted to release the piston locking means whereby the hydrostatic pressure forceably urges the piston forwardly to make it impinge on the rear end of said rod and cause the plate to move outwardly thereby to produce surges in the water, and a stationary auxiliary cylinder coaxially rigid with the first-mentioned cylinder closed at its outer end and a cylindrical section coaxially rigid with the plate, extending to the front thereof and adapted to slidingly and sealingly engage said auxiliary cylinder.

5. A generator of wave trains as claimed in claim 4, wherein the plate is constituted by a circular disc.

6. A generator of wave trains as claimed in claim 4 comprising means feeding a compressed gas into the cylinder to urge the piston back into its position near the rear end of the cylinder and means adapted to produce a partial vacuum to the front of the piston after return of the piston into said position.

7. A generator of wave trains as claimed in claim 4 comprising hydraulic means adapted to control the return of the piston after operation into its position near the rear end of the cylinder.

* * * * *